United States Patent
Kim et al.

(10) Patent No.: US 10,390,195 B2
(45) Date of Patent: Aug. 20, 2019

(54) METHOD FOR TRANSMITTING ALARM MESSAGE IN V2V COMMUNICATION AND DEVICE FOR SAME

(71) Applicant: LG ELECTRONICS INC., Seoul (KR)

(72) Inventors: Youngtae Kim, Seoul (KR); Hanbyul Seo, Seoul (KR); Hyukjin Chae, Seoul (KR); Hakseong Kim, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/738,037

(22) PCT Filed: Jun. 22, 2016

(86) PCT No.: PCT/KR2016/006600
§ 371 (c)(1),
(2) Date: Dec. 19, 2017

(87) PCT Pub. No.: WO2016/208954
PCT Pub. Date: Dec. 29, 2016

(65) Prior Publication Data
US 2018/0310147 A1    Oct. 25, 2018

Related U.S. Application Data

(60) Provisional application No. 62/182,649, filed on Jun. 22, 2015, provisional application No. 62/188,472, filed on Jul. 2, 2015.

(51) Int. Cl.
H04W 52/02    (2009.01)
H04W 4/46    (2018.01)
(Continued)

(52) U.S. Cl.
CPC ............... *H04W 4/46* (2018.02); *H04W 4/40* (2018.02); *H04W 52/0229* (2013.01);
(Continued)

(58) Field of Classification Search
CPC . H04W 4/46; H04W 68/005; H04W 52/0229; H04W 4/06
See application file for complete search history.

(56) References Cited

U.S. PATENT DOCUMENTS

2003/0071751 A1* 4/2003 Barrick ............... G01S 7/02
342/104
2010/0194592 A1 8/2010 Yim et al.
(Continued)

FOREIGN PATENT DOCUMENTS

JP    2002261685    9/2002
JP    2003508985    3/2003
(Continued)

OTHER PUBLICATIONS

PCT International Application No. PCT/KR2016/006600, Written Opinion of the International Searching Authority dated Sep. 28, 2016, 16 pages.
(Continued)

*Primary Examiner* — Chi Ho A Lee
*Assistant Examiner* — Andrew Lee
(74) *Attorney, Agent, or Firm* — Lee Hong Degerman Kang & Waimey

(57) ABSTRACT

Disclosed is a method for transmitting and receiving an alarm in V2X communication so as to prevent waste of power and radio resources. The method for transmitting and receiving an alarm according to the present invention involves transmitting an alarm message containing the rating information of an actual event, prior to transmitting a message containing information of the event. On the basis of
(Continued)

the rating, a receiving end can decide whether or not to receive a subsequent message, thereby saving power.

12 Claims, 11 Drawing Sheets

(51) Int. Cl.
*H04W 68/00* (2009.01)
*H04W 4/40* (2018.01)
*H04W 4/06* (2009.01)
*H04W 4/12* (2009.01)

(52) U.S. Cl.
CPC ............ *H04W 68/005* (2013.01); *H04W 4/06* (2013.01); *H04W 4/12* (2013.01); *Y02D 70/122* (2018.01); *Y02D 70/126* (2018.01); *Y02D 70/14* (2018.01); *Y02D 70/24* (2018.01)

(56) References Cited

U.S. PATENT DOCUMENTS

| | | | |
|---|---|---|---|
| 2010/0250346 A1 | 9/2010 | Bai et al. | |
| 2010/0290378 A1* | 11/2010 | Wu | H04W 52/0216 370/311 |
| 2011/0202113 A1 | 8/2011 | Persson et al. | |
| 2013/0289859 A1 | 10/2013 | Kim | |
| 2014/0148197 A1* | 5/2014 | Shields | H04W 4/90 455/456.1 |
| 2015/0035685 A1* | 2/2015 | Strickland | B60Q 9/008 340/901 |
| 2015/0364944 A1* | 12/2015 | Garcia Briz | H02J 5/005 307/104 |
| 2016/0001781 A1* | 1/2016 | Fung | B60W 40/08 701/36 |
| 2016/0219510 A1* | 7/2016 | Asterjadhi | H04W 52/0274 |
| 2016/0234690 A1* | 8/2016 | Michalski | H04W 4/06 |
| 2016/0288708 A1* | 10/2016 | Chang | B60Q 9/00 |
| 2017/0032402 A1* | 2/2017 | Patsiokas | G06Q 30/0266 |
| 2017/0069144 A1* | 3/2017 | Lawrie-Fussey | G07C 5/085 |
| 2018/0020365 A1* | 1/2018 | Xiong | H04W 74/0833 |

FOREIGN PATENT DOCUMENTS

| | | |
|---|---|---|
| JP | 2005229477 | 8/2005 |
| JP | 2014501062 | 1/2014 |
| JP | 2015043478 | 3/2015 |

OTHER PUBLICATIONS

LG Electronics, "V2V/V2I communication", 3GPP TSG-SA WG1 Meeting #70, S1-151103, Apr. 2015, 4 pages.

* cited by examiner

METHOD FOR TRANSMITTING ALARM MESSAGE IN V2V COMMUNICATION AND DEVICE FOR SAME

CROSS-REFERENCE TO RELATED APPLICATIONS

This application is the National Stage filing under 35 U.S.C. 371 of International Application No. PCT/KR2016/006600, filed on Jun. 22, 2016, which claims the benefit of U.S. Provisional Application Nos. 62/182,649, filed on Jun. 22, 2015 and 62/188,472, filed on Jul. 2, 2015, the contents of which are all hereby incorporated by reference herein in their entirety.

TECHNICAL FIELD

The present invention relates to a wireless communication system, and more particularly, to a method of sending an alarm message in V2V (vehicle-to-vehicle) communication and apparatus therefor.

BACKGROUND ART

According to intelligent transportation systems (ITS), many ongoing efforts are made to research and develop methods for exchanging various informations such as real-time traffic information and/or safety warning between vehicles. For example, ongoing efforts are made to research and develop vehicle communications for a proximity service (ProSe) and a public warning system. A communication interface for a vehicle can be commonly called V2X (vehicle-to-x). V2X communication may be categorized into V2V (vehicle-to-vehicle) communication, V2P (vehicle-to-pedestrian) communication, and V2I (vehicle-to-infrastructure entity) communication. V2V communication may refer to communication between vehicles. V2P communication may refer to communication between a vehicle and a personally carried device (e.g., a handheld terminal of a pedestrian or a bicycle rider). And, V2I communication may refer to communication between a vehicle and a roadside unit (RSU). RSU may refer to a traffic infrastructure entity. For example, RSU may include an entity that transmits a speed notification. For V2X communication, a vehicle, an RSU and a handheld device may be equipped with a transceiver.

As describe above, V2X communication may be used to indicate warnings for various events such as safety and the like. For example, information on an event occurring on a vehicle or road may be notified to another vehicle or pedestrians through V2X communication. For example, information on a warning of a traffic accident, a road situation change, or an accident danger may be forwarded to another vehicle or pedestrian. For example, a pedestrian, who is adjacent to or crossing a road, can be informed of information on vehicle approach. For example, information on such an event may be broadcasted to an ambient vehicle, pedestrian or RSU by a vehicle, pedestrian or RSU. Yet, another vehicle or pedestrian approaching a corresponding event occurring place may not be able to obtain the broadcasted information. Hence, the information on the event may be repeatedly broadcasted. Yet, in this case, due to the repeated broadcasting, resource overhead may increase as well as power consumption. Moreover, since a receiving end is unable to know when a broadcasting will occur, a communication device of a vehicle or pedestrian may be maintained in wake-up state. In this case, power consumption of the receiving end may increase. Hence, the demand for a V2X communication method capable of reducing power consumption as well as securing reception of information on an event is rising.

The present invention is devised to solve the above problems, and intends to propose a method of reducing power consumption as well as raising receptibility of information on an event through V2X communication. Particularly, the present invention proposes a method of informing other devices of an occurrence of an event using an alarm message besides a message containing actual information on the event.

DISCLOSURE OF THE INVENTION

Technical Task

One technical task of the present invention is to provide a method of sending an alarm message in V2V (vehicle-to-vehicle) communication and apparatus therefor.

Technical Solutions

In one technical aspect of the present invention, provided herein is a method, including In another technical aspect of the present invention, provided herein is a, including

Advantageous Effects

According to embodiments of the present invention, a more effective method of sending an alarm message in V2V communication and apparatus therefor can be provided.

According to embodiments of the present invention, a method of sending an alarm message in V2V (vehicle-to-vehicle) communication and apparatus therefor can be provided, whereby power consumption is reduced as well as reception of the alarm message is secured.

The effects of the present invention are not limited to the above-described effects and other effects which are not described herein may be derived by those skilled in the art from the following description of the embodiments of the present invention. That is, effects which are not intended by the present invention may be derived by those skilled in the art from the embodiments of the present invention.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention.

BEST MODE FOR INVENTION

Figure 1:
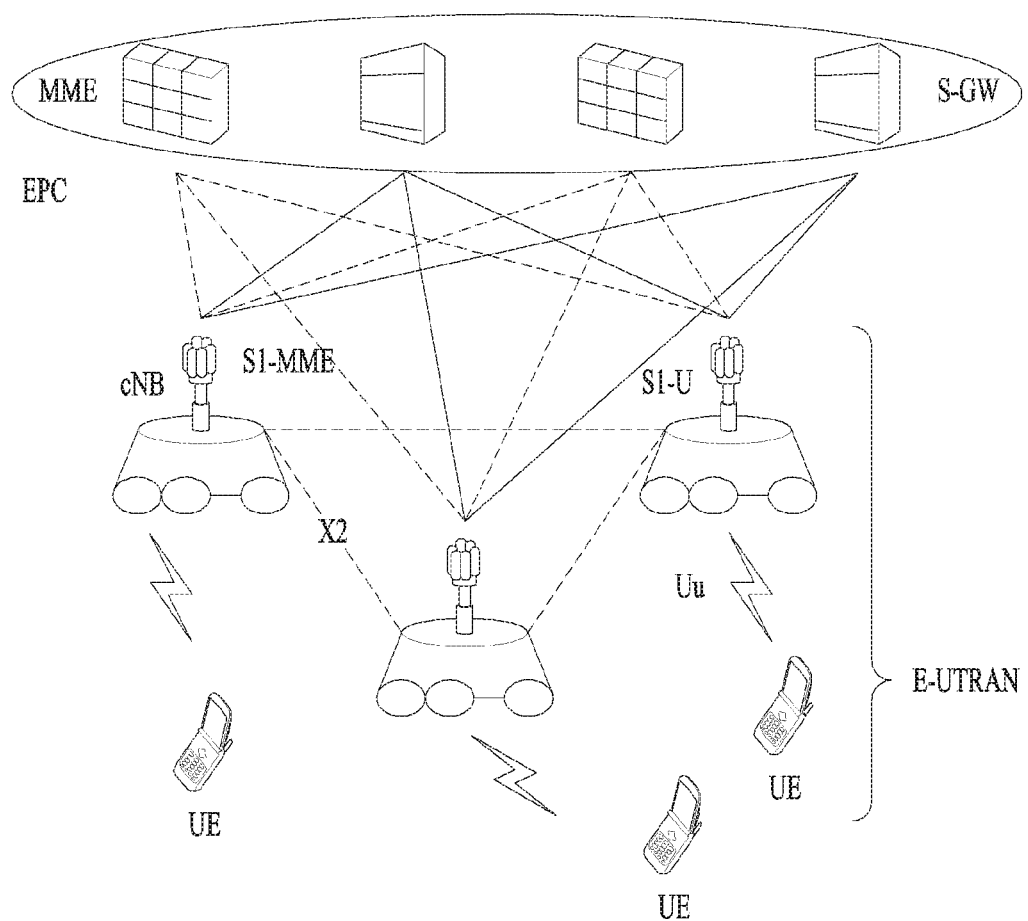
FIG. 1 shows a system architecture of an LTE system which is an example of a wireless communication system.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In this specification, the embodiments of the present invention have been described based on the data transmission and reception between a base station BS and a user equipment UE. In this case, the base station BS means a terminal node of a network, which performs direct communication with the user equipment UE. A specific operation which has been described as being performed by the base station may be performed by an upper node of the base station BS as the case may be.

In other words, it will be apparent that various operations performed for communication with the user equipment UE in the network which includes a plurality of network nodes along with the base station may be performed by the base station BS or network nodes other than the base station BS. At this time, the base station BS may be replaced with terms such as a fixed station, Node B, eNode B (eNB), and an access point (AP). A relay node may be replaced with terms such as a relay node (RN) and a relay station (RS). Also, a terminal may be replaced with terms such as a user equipment (UE), a mobile station (MS), a mobile subscriber station (MSS), and a subscriber station (SS).

Specific terminologies hereinafter used in the embodiments of the present invention are provided to assist understanding of the present invention, and various modifications may be made in the specific terminologies within the range that they do not depart from technical spirits of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention may be supported by standard documents disclosed in at least one of wireless access systems, i.e., IEEE 802 system, 3GPP system, 3GPP LTE system, 3GPP LTE, 3GPP LTE-A (LTE-Advanced) system, and 3GPP2 system. Namely, among the embodiments of the present invention, apparent steps or parts, which are not described to clarify technical spirits of the present invention, may be supported by the above documents. Also, all terminologies disclosed herein may be described by the above standard documents.

The following technology may be used for various wireless access systems such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as universal terrestrial radio access (UTRA) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) communication system is a part of an evolved UMTS (E-UMTS) that uses E-UTRA, and uses OFDMA in a downlink while uses SC-FDMA in an uplink. LTE-advanced (LTE-A) is an evolved version of the 3GPP LTE system. WiMAX may be described by the IEEE 802.16e standard (WirelessMAN-OFDMA Reference System) and the advanced IEEE 802.16m standard (WirelessMAN-OFDMA Advanced system). Although the following description will be based on the 3GPP LTE system and the 3GPP LTE-A system to clarify description, it is to be understood that technical spirits of the present invention are not limited to the 3GPP LTE and the 3GPP LTE-A system.

LTE System Architecture

The architecture of an LTE system, which is an example of a wireless communication system to which the present invention is applicable, will be described with reference to FIG. 1. The LTE system is a mobile communication system that has evolved from UMTS. As shown in FIG. 1, the LTE system architecture may be broadly divided into an Evolved UMTS Terrestrial Radio Access Network (E-UTRAN) and an Evolved Packet Core (EPC). The E-UTRAN includes a user equipment (UE) and an Evolved NodeB (eNB). An interface between a UE and an eNB is referred to as a Uu interface, and an interface between eNBs is referred to as an X2 interface. The EPC includes a mobility management entity (MME) functioning as the control plane and a serving gateway (S-GW) functioning as the user plane. An interface between an eNB and an MME is referred to as an S1-MME interface, and an interface between an eNB and an S-GW is referred to as an S1-U interface, and the two interfaces may also be called an Si interface.

Figure 2:
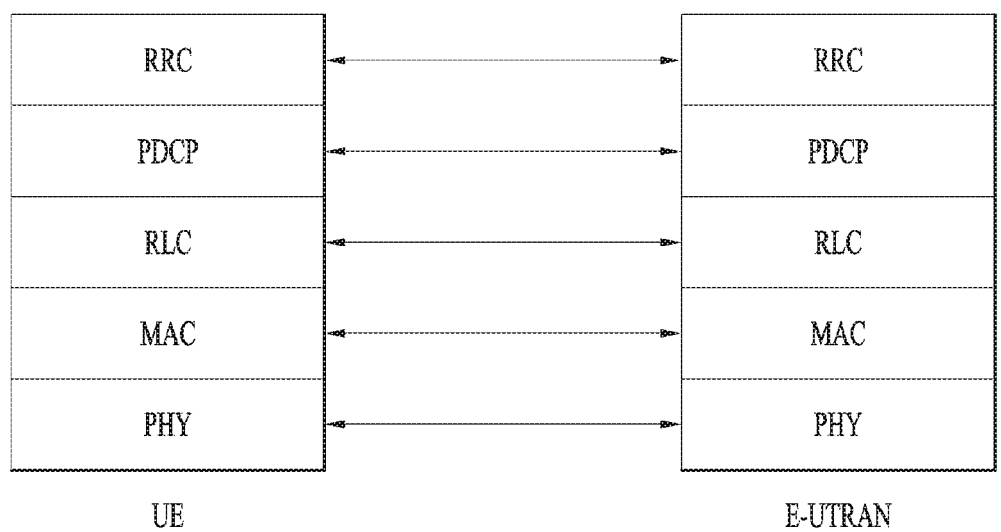
FIG. 2 illustrates a control plane of a radio protocol.
Figure 3:
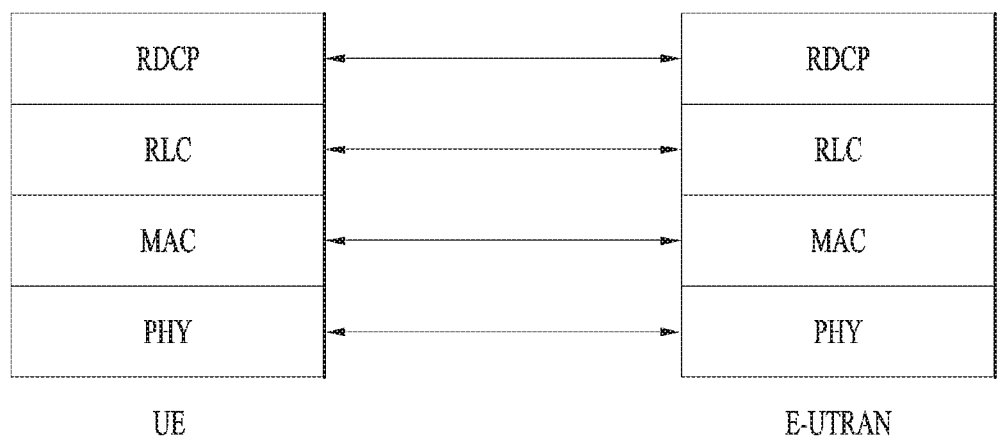
FIG. 3 illustrates a user plane of a radio protocol.

A radio interface protocol is defined in the Uu interface which is a radio section, wherein the radio interface protocol is horizontally comprised of a physical layer, a data link layer and a network layer, and vertically divided into a user plane for user data transmission and a control plane for signaling (control signal) transfer. Such a radio interface protocol may be typically classified into L1 (first layer) including a PHY which is a physical layer, L2 (second layer) including Media Access Control (MAC)/Radio Link Control (RLC)/Packet Data Convergence Protocol (PDCP) layers, and L3 (third layer) including a Radio Resource Control (RRC) layer as illustrated in FIGS. 2 and 3, based on the three lower layers of the Open System Interconnection (OSI) reference model widely known in the field of communication systems. These layers exist as a pair in the UE and E-UTRAN, and are responsible for data transmission of the Uu interface.

Hereinafter, each layer of a radio protocol shown in FIGS. 2 and 3 is described. FIG. 2 illustrates a control plane of a radio protocol, and FIG. 3 illustrates a user plane of a radio protocol.

The physical (PHY) layer serving as the first layer (L1) provides an information transfer service for a higher layer using a physical channel. The PHY layer is connected to the Media Access Control (MAC) layer serving as a higher layer over a transport channel. Through the transport channel, data is transferred from the MAC layer to the physical layer and vice versa. In this case, the transport channel is broadly divided into a dedicated transport channel and a common transport channel depending on whether or not the channel is shared. In addition, data is transferred between different PHY layers, i.e., between a PHY layer of a transmitter and a PHY layer of a receiver over a physical channel using radio resources.

There are various layers in the second layer. The MAC layer serves to map various logical channels to various transport channels and to perform logical channel multiplexing of mapping a plurality of logical channels to one transport channel. The MAC layer is connected to the Radio Link Control (RLC) layer, which is a higher layer, through a logical channel. The logical channel is broadly divided into a control channel for transmitting information on the control plane and a traffic channel for transmitting information on the user plane according to the type of information to be transmitted.

The RLC layer of the L2 segments and concatenates data received from a higher layer to adjust the data size such that the data is suitable for a lower layer to transmit the data in a radio section. To ensure various QoS levels required by various radio bearers (RBs), the RLC layer provides three RLC modes, namely, Transparent Mode (TM), Unacknowledged Mode (UM), and Acknowledged Mode (AM). Particularly, the AM RLC performs a retransmission function using an Automatic Repeat and Request (ARQ) function so as to implement reliable data transmission.

In order to efficiently transmit IP packets such as IPv4 or IPv6 packets in a radio section having a narrow bandwidth, the packet data convergence protocol (PDCP) layer of the L2 performs header compression to reduce the size of an IP packet header containing relatively large and unnecessary control information. This makes it possible to transmit only necessary information in the header portion of the data, thereby increasing the transmission efficiency of the radio section. In the LTE system, the PDCP layer also performs a security function, which consists of a ciphering function to prevent a third party from intercepting data and an integrity protection function to prevent a third party from manipulating data.

The Radio Resource Control (RRC) layer located at the top of the third layer (L3) is defined only in the control plane and is responsible for control of logical, transport, and physical channels in association with configuration, reconfiguration and release of Radio Bearers (RBs). Here, the RB refers to a logical path that the L1 and L2 of the radio protocol provide for data communication between the UE and the UTRAN. Generally, configuring an RB means that a radio protocol layer and channel characteristics needed to provide a specific service are defined and detailed parameters and operation methods thereof are configured. The RB is divided into a Signaling RB (SRB) and a Data RB (DRB). The SRB is used as a transmission passage of RRC messages in the control plane, and the DRB is used as a transmission passage of user data in the user plane.

LTE/LTE-A Resource Structure/Channel

Hereinafter, a DL radio frame structure will be described with reference to FIGS. 4 and 5.

In a cellular OFDM wireless packet communication system, an uplink (UL)/downlink (DL) data packet is transmitted on a subframe-by-subframe basis, and one subframe is defined as a predetermined time interval including a plurality of OFDM symbols. 3GPP LTE supports a type-1 radio frame structure applicable to frequency division duplex (FDD) and a type-2 radio frame structure applicable to time division duplex (TDD).

Figure 4:
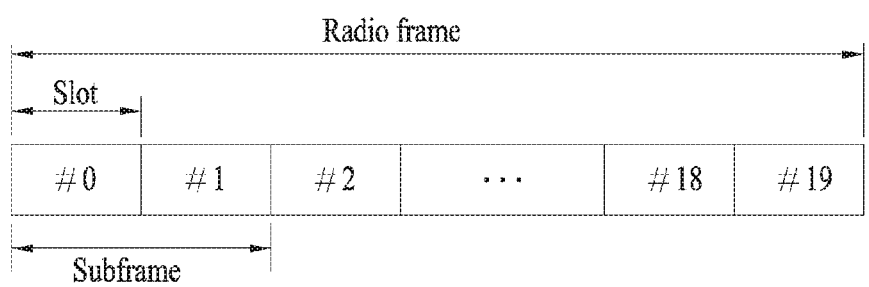
FIG. 4 illustrates the structure of a type-1 radio frame.

FIG. 4 illustrates the type-1 radio frame structure. A downlink radio frame is divided into 10 subframes. Each subframe is further divided into two slots in the time domain. A unit time during which one subframe is transmitted is defined as transmission time interval (TTI). For example, one subframe may be 1 ms in duration and one slot may be 0.5 ms in duration. A slot may include a plurality of orthogonal frequency division multiplexing (OFDM) symbols in the time domain and includes a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. A Resource Block (RB) is a resource allocation unit including a plurality of contiguous subcarriers in a slot.

Figure 5:
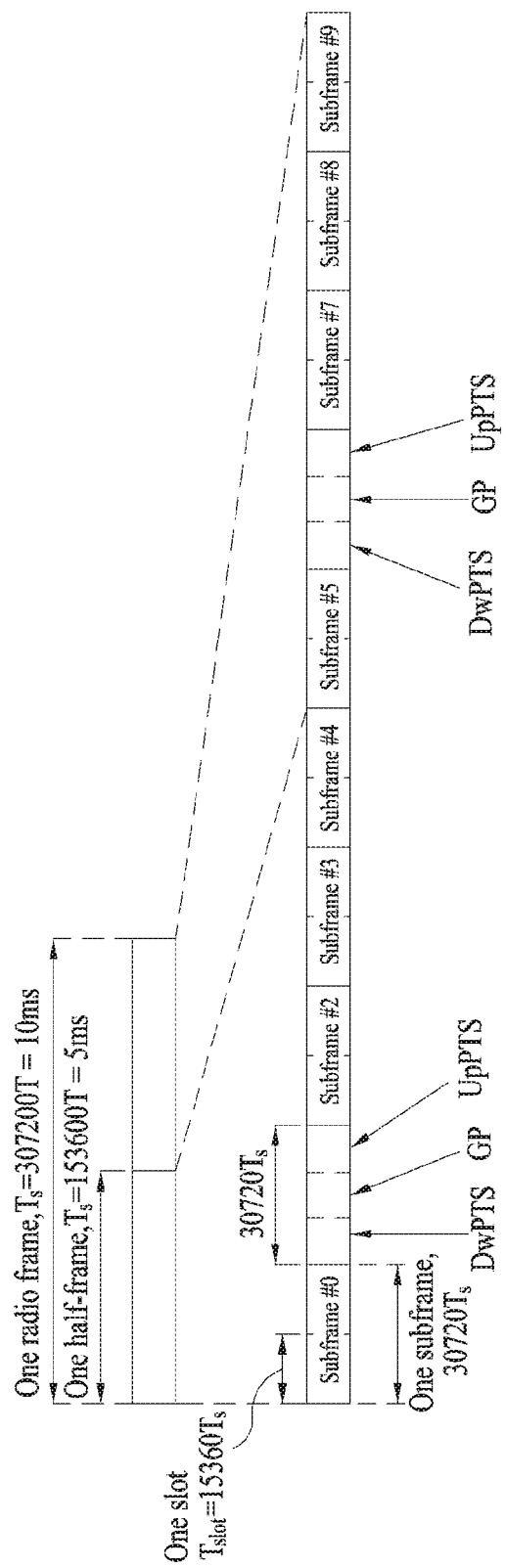
FIG. 5 illustrates the structure of a type-2 radio frame.

FIG. 5 illustrates the type-2 radio frame structure. The type-2 radio frame includes two half frames each having 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and uplink transmission synchronization in a UE. The GP is a period between a downlink and an uplink, for eliminating interference with the uplink caused by multi-path delay of a downlink signal. A subframe is composed of two slots irrespective of radio frame type.

The above-described radio frame structures are purely exemplary and thus it is to be noted that the number of subframes in a radio frame, the number of slots in a subframe, or the number of symbols in a slot may vary.

Figure 6:
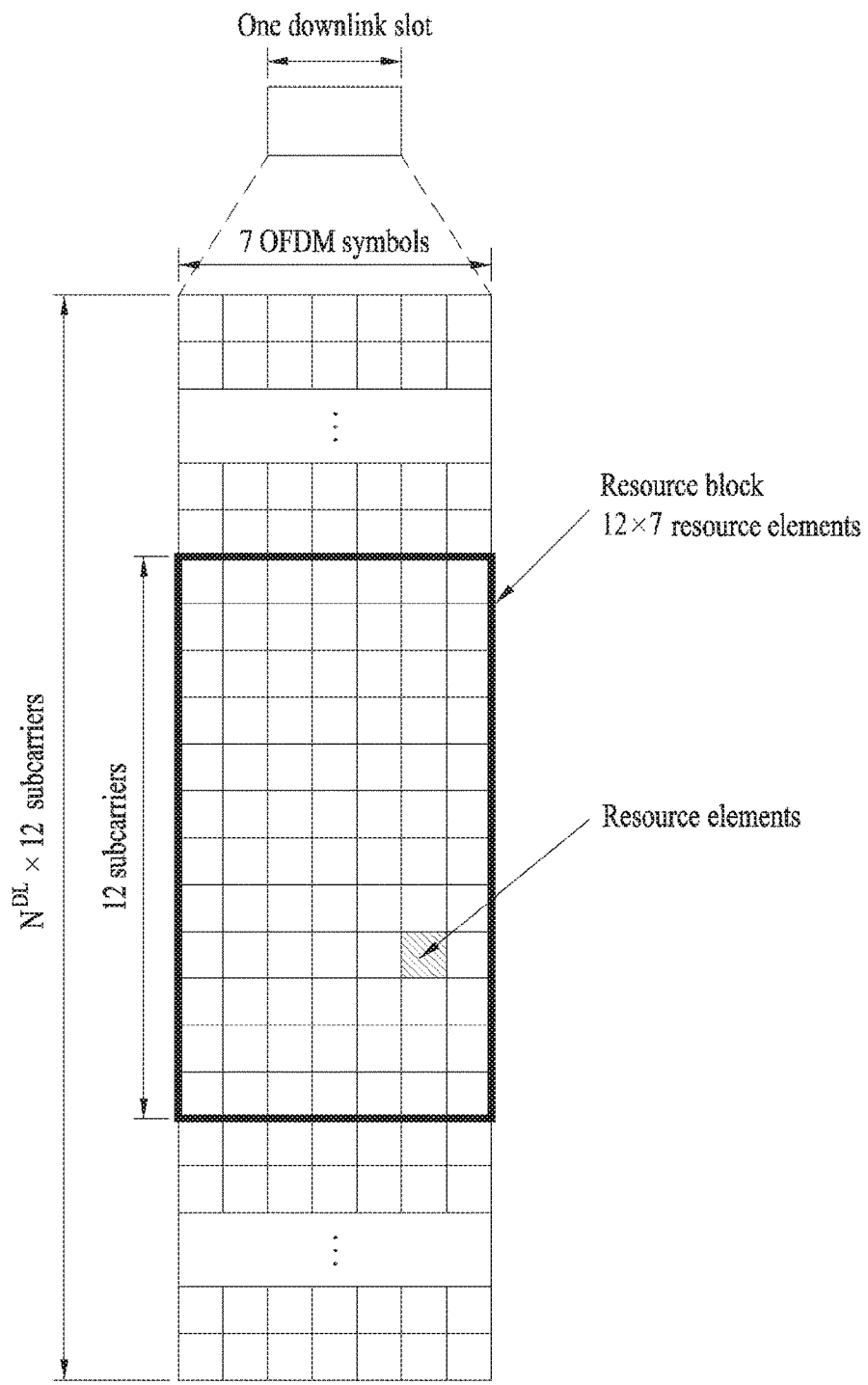
FIG. 6 illustrates a resource grid in a downlink slot.

FIG. 6 illustrates a resource grid for a downlink slot. A downlink slot includes 7 OFDM symbols in the time domain and an RB includes 12 subcarriers in the frequency domain, which does not limit the scope and spirit of the present invention. For example, a slot includes 7 OFDM symbols in the case of normal CP, whereas a slot includes 6 OFDM symbols in the case of extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 7:
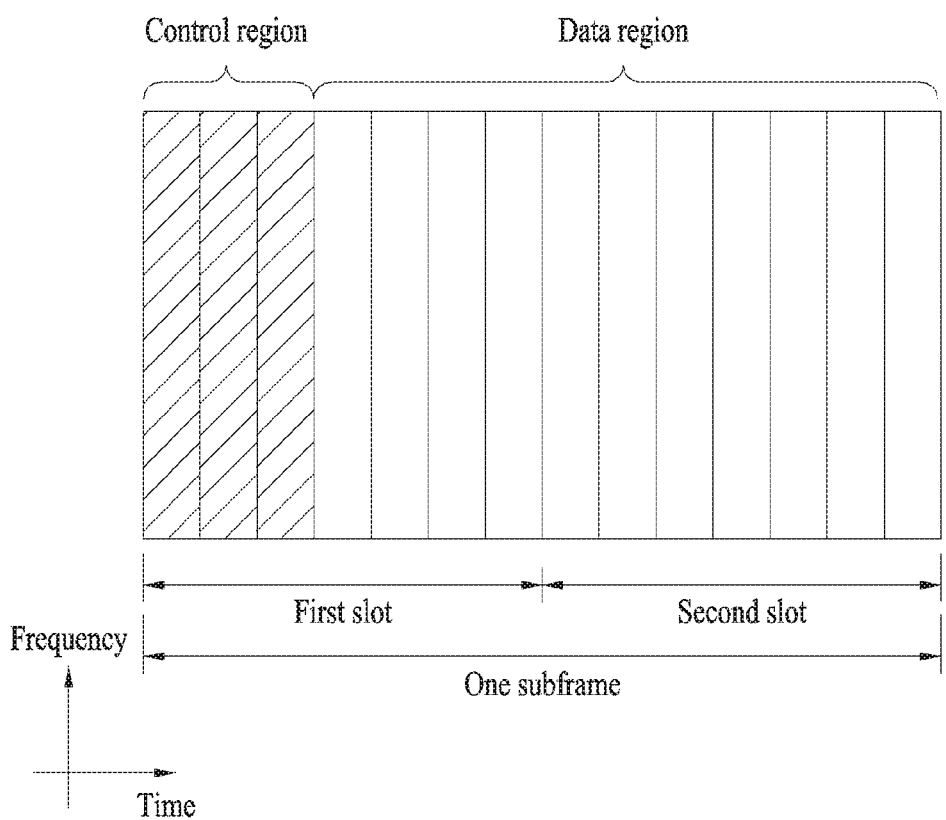
FIG. 7 illustrates a downlink subframe structure.

FIG. 7 illustrates a downlink subframe structure. Up to three OFDM symbols at the start of the first slot in a downlink subframe are used for a control region to which control channels are allocated and the other OFDM symbols of the downlink subframe are used for a data region to which a PDSCH is allocated. Downlink control channels used in 3GPP LTE include a physical control format indicator channel (PCFICH), a physical downlink control channel (PDCCH), and a physical hybrid automatic repeat request (ARQ) indicator channel (PHICH). The PCFICH is located in the first OFDM symbol of a subframe, carrying information about the number of OFDM symbols used for transmission of control channels in the subframe. The PHICH delivers a HARQ acknowledgment/negative acknowledgment (ACK/NACK) signal in response to an uplink transmission. Control information carried on the PDCCH is called downlink control information (DCI). The DCI includes uplink resource allocation information, downlink resource allocation information or an uplink transmit (Tx) power control command for an arbitrary UE group. The PDCCH delivers information about resource allocation and a transport format for a Downlink Shared Channel (DL-SCH), resource allocation information about an Uplink Shared Channel (UL-SCH), paging information of a Paging Channel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregation of one or more consecutive Control Channel Elements (CCEs). A CCE is a logical allocation unit used to provide a PDCCH at a coding rate based on the state of a radio channel. A CCE corresponds to a plurality of REs. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH carries a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 8:
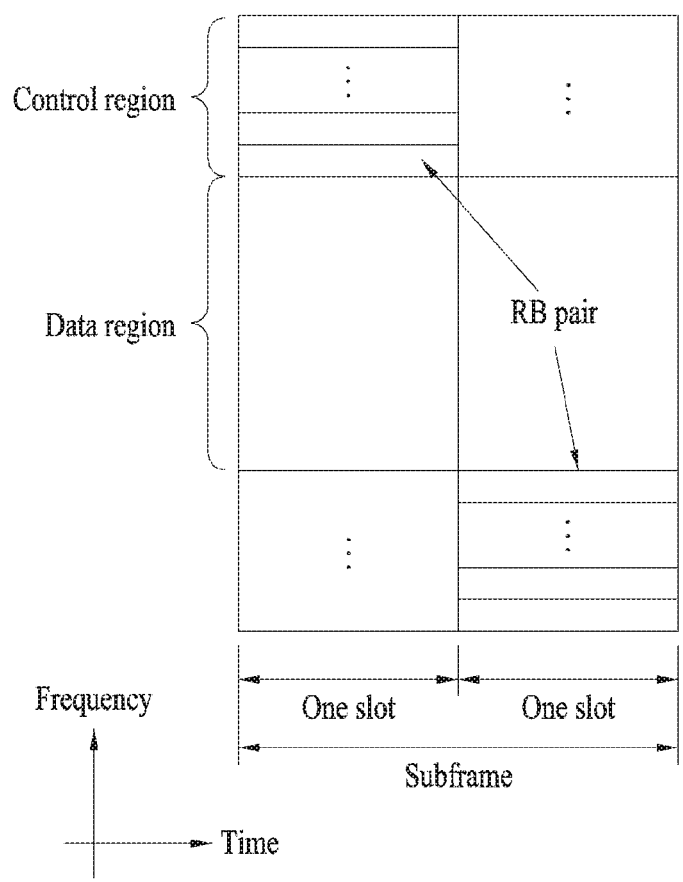
FIG. 8 illustrates an uplink subframe structure.

FIG. 8 illustrates an uplink subframe structure. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Various embodiments related to D2D communication (also called D2D direct communication) will hereinafter be given. Although D2D communication will hereinafter be described based on 3GPP LTE/LTE-A, it should be noted that D2D communication may also be applied to other communication systems (IEEE 802.16, WiMAX etc.).

D2D Communication Type

D2D communication may be classified into Network coordinated D2D communication and Autonomous D2D communication according to whether D2D communication is executed under network control. The network coordinated D2D communication may be classified into a first type (Data only in D2D) in which D2D communication is used to transmit only data and a second type (Connection Control only in Network) in which the network performs only access control according to the degree of network intervention. For convenience of description, the first type will hereinafter be referred to as a Network Centralized D2D communication type, and the second type will hereinafter be referred to as a distributed D2D communication type.

In the Network Centralized D2D communication type, only data is exchanged between D2D UEs, and connection control between D2D UEs and radio resource allocation (grant message) may be carried out by the network. D2D UEs may transmit and receive data and specific control information using radio resources allocated by the network. For example, HARQ ACK/NACK feedback for data reception between D2D UEs, or Channel State Information (CSI) may not be directly exchanged between the D2D UEs, and may be transmitted to another D2D UE over the network. In more detail, if the network configures a D2D link between D2D UEs and allocates radio resources to the configured D2D link, a transmission D2D UE and a reception D2D UE may perform D2D communication using radio resources. In other words, in the network centralized D2D communication type, D2D communication between D2D UEs may be controlled by the network, and D2D UEs may perform D2D communication using radio resources allocated by the network.

The network in the distributed D2D communication type may perform a more limited role than a network in the network centralized D2D communication type. Although the network of the distributed D2D communication type performs access control between D2D UEs, radio resource allocation (grant message) between the D2D UEs may be autonomously occupied by competition of the D2D UEs without the help of the network. For example, HARQ ACK/NACK or CSI in association with data reception between D2D UEs may be directly exchanged between the D2D UEs without passing through the network.

As illustrated in the above example, D2D communication may be classified into network centralized D2D communication and distributed D2D communication according to the degree of D2D communication intervention of the network. In this case, the network centralized D2D communication type and the distributed D2D communication type are characterized in that D2D access control is performed by the network.

In more detail, the network for use in the network coordinated D2D communication type may configure a D2D link between the D2D UEs scheduled to perform D2D communication, such that connection between the D2D UEs may be constructed. When configuring a D2D link between the D2D UEs, the network may assign a physical D2D link identifier (LID) to the configured D2D link. When plural D2D links are present between the D2D UEs, the physical D2D link ID may be used as an ID for identifying each D2D link.

Unlike the network centralized and distributed D2D communication types, the autonomous D2D communication type may allow the D2D UEs to perform D2D communication freely without the help of the network. That is, unlike the network centralized and distributed D2D communication types, the autonomous D2D communication type may control the D2D UE to autonomously perform access control and radio resource occupancy. If necessary, the network may also provide the D2D UE with D2D channel information capable of being used in the corresponding cell.

D2D Communication Link Configuration

For convenience of description, a UE, which is scheduled to perform or can perform D2D communication including D2D direct communication, will hereinafter be referred to as a D2D UE. If a transmitter and a receiver need to be distinguished from each other, a D2D UE, which is scheduled to transmit or can transmit data to another D2D UE using radio resources allocated to the D2D link during D2D communication, will hereinafter be referred to as a transmission (Tx) D2D UE, or another UE, which is scheduled to receive or can receive data from the Tx D2D UE, will hereinafter be referred to as a reception (Rx) D2D UE. If a plurality of D2D UEs, which is scheduled to receive or can receive data from the Tx D2D UE, is used, the Rx D2D UEs may also be identified by ordinal numerals such as "1st to Nth". For convenience of description, either a base station (BS) for controlling access between the D2D UEs or allocating radio resources to the D2D link or a node (such as a D2D server, and an access/session management server) located at a network stage will hereinafter be referred to as a network.

D2D UE scheduled to perform D2D communication needs to pre-recognize the presence or absence of neighbor D2D UEs capable of transmitting and receiving data so as to transmit data to another D2D UE through D2D communication. For this purpose, the D2D UE may perform D2D peer discovery. The D2D UE may perform D2D discovery within a discovery interval, and all D2D UEs may share the discovery interval. The D2D UE may monitor logical channels of a discovery region within the discovery interval, and may thus receive D2D discovery signals from other D2D UEs. D2D UEs having received a transmission (Tx) signal from another D2D UE may construct the list of neighbor D2D UEs using a reception (Rx) signal. In addition, D2D UE may broadcast its own information (i.e., ID) within the discovery interval, and other D2D UEs may receive the broadcast D2D discovery signal, such that the presence of the corresponding D2D UE in a D2D communication available range may be recognized.

Information for the D2D discovery may be broadcasted periodically. In addition, a timing of such a broadcast may be determined by a protocol in advance and then informed D2D UEs. The D2D UE may transmit/broadcast a signal during a part of the discovery interval and each D2D UE may monitor signals potentially transmitted by other D2D UEs during the rest of the D2D discovery interval.

For instance, the D2D discovery signal may be a beacon signal. In addition, D2D discovery intervals may include a multitude of symbols (e.g., OFDM symbols). The D2D UE may transmit/broadcast the D2D discovery signal in a manner of selecting at least one symbol in the D2D discovery interval. Moreover, the D2D may transmit a signal corresponding to one tone existing in the symbol selected by the D2D UE.

After the D2D UEs discover each other through the D2D discovery process, the D2D UEs may establish a connection establishment process and transmit traffics to other D2D UEs.

Figure 9:
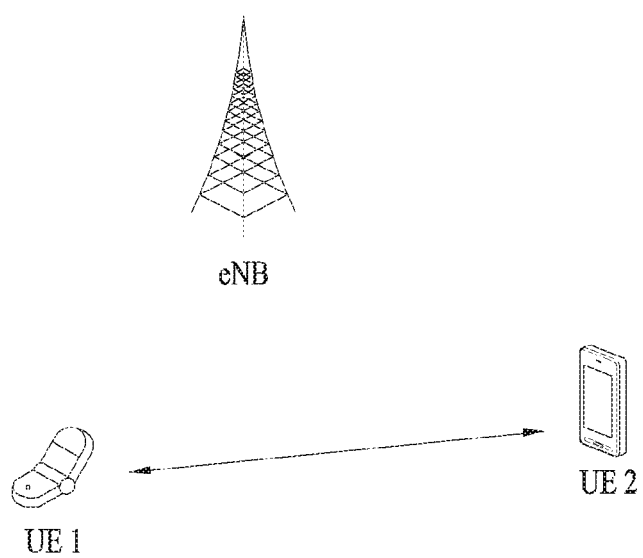
FIG. 9 shows a simplified D2D communication network.

FIG. 9 schematically shows a D2D communication network.

In FIG. 9, D2D communication is performed between UEs (UE1 and UE2) supporting the D2D communication. In general, a UE (user equipment) means a user terminal. However, when a network equipment such as an eNB (evolved Node B) transceives signals according to a communication scheme between UEs (UE1 and UE2), the eNB may also be regarded as a kind of the UE.

The UE1 may be configured to select a resource unit corresponding to specific resources in a resource pool indicating a set of resources and transmit a D2D signal using the corresponding resource unit. The UE2 corresponding to a receiving UE may receive a configuration of the resource pool used by the UE1 to transmit the signal and detect the signal of the UE1 in the corresponding resource pool. For example, when the UE1 is within a coverage of a BS, the BS may inform the resource pool. On the other hand, for example, when the UE1 is out of the coverage of the BS, another UE may inform the UE1 of the resource pool or the UE1 may determine the resource pool based on predetermined resources. Generally, the resource pool may include a plurality of resource units and each UE may select one or a plurality of resource units to transmit its D2D signal.

In the aforementioned D2D communication, the term 'D2D' can be replaced by 'sidelink'.

Figure 10:
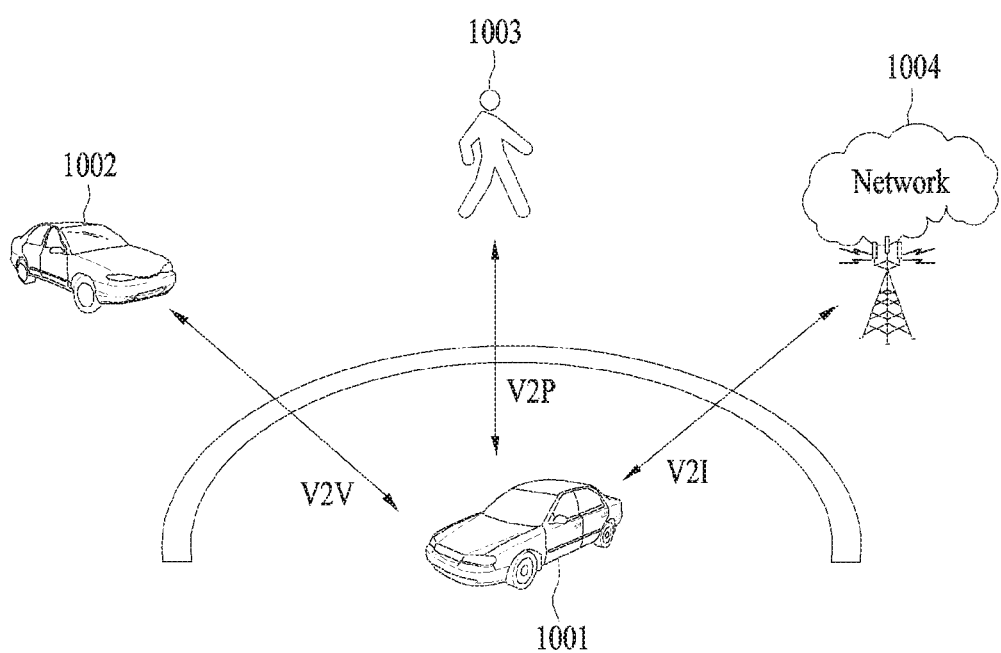
FIG. 10 is a schematic diagram showing a V2X communication network.

FIG. 10 is a schematic diagram showing a V2X communication network.

V2X communication may be categorized into V2V (vehicle-to-vehicle) communication, V2P (vehicle-to-pedestrian) communication, and V2I (vehicle-to-infrastructure entity) communication. V2V communication may refer to communication between vehicles 1001 and 1002. Traffic information and the like may be shared between the vehicles 1001 and 1002 through V2V communication. V2P communication may refer to communication between the vehicle 1001 and a device (e.g., a handheld terminal of a pedestrian or a bicycle rider) carried by a pedestrian 1003. Since the pedestrian 1003 can move along a sidewalk adjacent to a road as well, information on a danger on the road and the like may be shared through V2P communication. And, V2I communication may refer to communication between the vehicle and a roadside unit (RSU) 1004. The RSU 1004 may refer to a traffic infrastructure entity. For example, the RSU 1004 may include an entity that transmits a speed notification. For V2X communication, the vehicles 1001 and 1002, the RSU 1004 and the handheld device of the pedestrian 1003 may be equipped with transceivers. V2X communication may be implemented using a technology similar to D2D (device-to-device) communication of the communication standard of the 3GPP (3rd generation partnership project). And, V2X communication may be implemented using DSRC (dedicated short-range communication) technology of IEEE (institute of electrical and electronics engineers).

In the following, a method of sending an alarm message through V2X communication according to an embodiment of the present invention is described. Although the following description is made centering on V2V communication, the following embodiments are applicable to V2I communication and/or V2P communication. Although the following embodiments are described centering on the communication standards of 3GPP, they may be applied by the technologies corresponding to the communication standards of IEEE. In the following description, the term 'sending (or transmission)' and the term 'broadcasting' are exchangeable with each other. In the following description, a vehicle or pedestrian may mean a vehicle or pedestrian carrying a user equipment. In the following description, a vehicle or pedestrian may be used as a term that means a terminal itself As described above, for the purpose of a warning or safety, an alarm message can be sent through V2X communication. Yet, as described above, a method for reducing power consumption as well as raising receptibility of a vehicle or UE (user equipment) is demanded.

In order to solve the aforementioned problems, in case that a specific event is broadcasted, a method of broadcasting an alarm message instead of a message containing substantial information on an event is proposed. For example, an alarm message indicating a presence of an event may be broadcasted instead of broadcasting direct information on a traffic accident. Hence, even if a message containing substantial information on an event is not received, a vehicle or pedestrian having received an alarm message can recognize that a prescribed event has occurred by receiving the alarm message.

In the following description, a vehicle or pedestrian may broadcast information on an occurring event. Moreover, a vehicle, RSU (roadside unit) or base station, which has recognized an event, may broadcast information on the event. In the following, a device that broadcasts information on an event may be called a broadcasting unit (BU). Hence, the broadcasting unit may include a vehicle, pedestrian, RSU or base station. For example, if a broadcasting unit includes an RSU or base station, information on an event may be broadcasted using a downlink resource. For example, if a broadcasting unit includes a vehicle and/or pedestrian, information on an event may be broadcasted using an uplink resource.

As described above, for a vehicle or pedestrian failing to hear information on an event, the information on the event can be broadcasted repeatedly. Yet, if such broadcasting is excessively repeated, a power of a broadcasting unit may be excessively consumed. Particularly, if a broadcasting unit is a pedestrian and has a limited power, the power consumption may become a very important issue. Hence, in order to reduce power consumption, an alarm message indicating that an event has occurred can be broadcasted at the frequency higher than that of a message containing information on the event. Having received the alarm message, a vehicle, pedestrian or RSU can recognize that the event has occurred. Yet, the alarm message may contain partial information on the corresponding event.

In case that a broadcasting unit broadcasts information on a specific event using a downlink or uplink resource, an alarm message for the event can be repeatedly broadcasted on a predetermined cycle. In the following description, the cycle for the broadcasting of the alarm message may be called an alarm broadcasting cycle. An alarm broadcasting cycle, a transmission count of an alarm message and/or a transmission interval of an alarm message may be defined in advance. Moreover, an alarm broadcasting cycle, a transmission count of an alarm message and/or a transmission period of an alarm message may be set for a broadcasting unit by a base station. For example, a base station may send information on an alarm broadcasting cycle, a transmission count of an alarm message and/or a transmission interval of an alarm message through higher layer signaling (e.g., radio resource control (RRC) signaling). An alarm broadcasting cycle may be set equal to a DRX (discontinuous reception) cycle or a paging cycle of a current LTE system. An alarm broadcasting cycle may be set for a resource pool in common. An alarm broadcasting cycle may be set for a preset vehicle or pedestrian group in common. And, an alarm broadcasting cycle may be set for vehicles and/or pedestrians within a specific base station in common.

For a resource for transmission of an alarm message, a frequency region may be determined in advance. Moreover, a base station may send information on the frequency region of the resource for the transmission of the alarm message through RRC signaling. The resource for the transmission of the alarm message may be set for each resource pool or preset. For example, the resource for the transmission of the alarm message may be set through RRC signaling or preset by a transmitting end. Moreover, an alarm message may be sent through a control channel of the aforementioned D2D communication. For example, an alarm message may be sent through PSCCH (physical sidelink control channel). Meanwhile, when a broadcasting unit is an RSU or base station, the broadcasting unit may send an alarm message to a vehicle or pedestrian using a paging.

An alarm message may include a plurality of alarms corresponding to a plurality of events. For example, alarms for a plurality of events may be broadcasted through a single alarm message. Moreover, a plurality of alarm messages respectively corresponding to a plurality of events may be broadcasted individually.

A vehicle or pedestrian may send an alarm message sending request to a broadcasting unit. For example, a resource for the alarm message sending request can be set periodically.

In the following, a message containing actual information on an event may be called an event message. An event message may include a context for an event. An event message may include a type, time and place of an event and/or any information related to another event. An event message may be set together with an alarm message for example. An event message may be sent once only together with an alarm message when the alarm message is initially sent. When an alarm message is sent, an event message may be sent together with the alarm message for n times, where n is a natural number. For example, an event message may be sent together with an alarm message when the alarm message is initially sent n times.

An event message may be sent according to a message broadcasting cycle. For example, each of an alarm message and an event message may be periodically broadcasted and have a different period. For example, a message broadcasting cycle and an alarm broadcasting cycle may have different values. A message broadcasting cycle, a transmission count of an event message and/or a transmission interval of an event message may be predefined. For example, a message broadcasting cycle may be set equal to a DRX (discontinuous reception) or paging cycle of a current LTE system. A message broadcasting cycle, a transmission count of an event message and/or a transmission interval of an event message may be set for a broadcasting unit by a base station. For example, a base station may send information on a message broadcasting cycle, a transmission count of an event message and/or a transmission period of an event message through higher layer signaling (e.g., RRC signaling). An event broadcasting cycle may be set for a resource pool in common. An event broadcasting cycle may be set for a preset vehicle or pedestrian group in common. And, an event broadcasting cycle may be set for vehicles and/or pedestrians within a specific base station in common. An event occurring vehicle or an event encountered vehicle may broadcast an alarm message for an event. For example, a vehicle may send an alarm message using the aforementioned transmitting resource. For example, a transmission resource of an alarm message may be configured periodically.

For example, a message broadcasting cycle of an event message may have a value 10 times greater than that of an alarm broadcasting cycle of an alarm message. In this case, having received an alarm message, a vehicle or pedestrian may determine a timing of sending an event message based on the alarm message. For example, an alarm message may contain information on a sending timing of an event message. At the timing determined on the basis of the alarm message, a receiving vehicle or pedestrian may receive or attempt to receive the event message. For example, a message broadcasting cycle may have a value N times greater than that of an alarm broadcasting cycle, where N is a natural number. Moreover, an alarm message may contain information indicating its order of being sent within a message broadcasting cycle. In this case, a receiving end may determine a timing of receiving an event message by obtaining the N value and the information within the alarm message. Moreover, the alarm message my contain information on a transmission count of the alarm message repeated until a transmission timing of the event message.

For a resource for transmission of an event message, a frequency region may be determined in advance. Moreover, a base station may send information on the frequency region of the resource for the transmission of the event message through RRC signaling. The resource for the transmission of the event message may be set for each resource pool or preset. For example, the resource for the transmission of the event message may be set through RRC signaling or preset by a transmitting end. Moreover, the resource for the transmission of the event message may be set different from that for transmission of an alarm message.

A vehicle and/or pedestrian may receive an event message together with an alarm message. In this case, the vehicle and/or pedestrian can obtain information on an event by decoding the event message. Yet, the vehicle and/or pedestrian may receive an alarm message only. For example, a broadcasting unit may have sent an alarm message only. For example, although a broadcasting unit has sent both an alarm message and an event message, a receiving end may receive the alarm message only. Having received the alarm message only, the receiving end (e.g., vehicle, pedestrian, and/or RSU) may make a request for sending an event message to the broadcasting unit. Moreover, the receiving end may receive an event message from a broadcasting unit different from the former broadcasting unit having sent the alarm message. The reception of the event message may be sent in response to the event message request. For example, the receiving end receives an alarm message from a base station or RSU and may then receive an event message from an ambient vehicle or pedestrian. Moreover, the receiving end receives an alarm message from an ambient vehicle or pedestrian and may then receive an event message from a base station or RSU. Having received the request for the transmission of the event message, the broadcasting unit may send an event message using a predefined radio resource or a resource selected by the broadcasting unit. The event message may include retransmitted or modified information.

A vehicle and/or pedestrians having received an alarm message may determine whether to receive an event message corresponding to the alarm message. For example, an alarm message may partially include information (e.g., type of event, etc.) on an event, and a vehicle and/or pedestrian may determine an event for requesting a transmission of an event message based on information within the alarm message. If an alarm message is received, whether to receive an event message may be determined based on a user input. A UE of a vehicle and/or pedestrian may provide a user with information corresponding to an alarm message. The user may be able to determine whether to receive an event message by viewing the information of the alarm message. For example, a vehicle may display the substance of an alarm message on a display within the vehicle or prove an audio notification. Moreover, a UE of a pedestrian may display the substance of an alarm message on a display or inform the pedestrian of a presence of an alarm message through vibration, warning sound and the like.

In case of receiving a plurality of alarm messages or an alarm message containing a plurality of alarms, a vehicle and/or pedestrian may make a request for a transmission of an event message for some of a plurality of events to a broadcasting unit. For example, an alarm message may partially contain information (e.g., type of event, etc.) on an event, and an event for requesting a transmission of an event message may be determined on the basis of information within the alarm message. Moreover, a vehicle and/or pedestrian may filter a confirmation required event among events corresponding to a plurality of alarms based on a preset condition and/or a user input. In this case, the vehicle and/or pedestrian may transition to a wake-up mode from a sleep mode at a timing of sending an event message of an event of receiving the event message only. Hence, since it is not necessary for the vehicle and/or pedestrian to transition to the wake-up mode for a reception of an event message for every event, power consumption of the vehicle and/or pedestrian can be reduced.

For example, a speed violation of a vehicle passing through a specific alley may be defined as an event. Moreover, both of a vehicle and a pedestrian may move through an alley. In this case, information on a speed violated vehicle may be sent to an ambient vehicle and/or pedestrian. For example, information on a location and/or speed of a speed violated vehicle and the like may be sent to an ambient vehicle and/or pedestrian. Moreover, information on a location and/or speed of a speed violated vehicle and the like may be contained in an alarm message. Moreover, an event triggering may be performed on a preset condition. For example, in case that a vehicle having violated a preset speed enters a corresponding alley, a transmission of an alarm message may be triggered. For example, in case that a preset number of persons or more are located in a corresponding alley, a transmission of an alarm message and/or an event message may be triggered. Based on such a preset condition, a base station or RSU may operate to broadcast an alarm message and/or an event message.

An alarm message and/or an event message may include a cell-specific message and/or a UE-specific (user equipment-specific) message. For example, an alarm message and/or an event message may contain an identifier that indicates cell-specific or UE-specific. A vehicle or pedestrian can identify whether a corresponding message is a cell-specific message or a UE-specific message by confirming an identifier within an alarm message. For example, an alarm message may contain an identifier for identifying a cell or an identifier for specifying a UE. An alarm message may contain information on locations of a vehicle and/or pedestrians for reception of an event. For example, an alarm message may contain information on an occurrence location of an event and/or information on a broadcasting radius. A vehicle and/or pedestrian may determine whether to receive a message for a corresponding event based on occurrence location information of an event within an alarm message and/or information on a broadcasting radius and location information of the vehicle and/or pedestrian. For example, information on a broadcasting radius may be preset, and information on a broadcasting radius may be predefined according to a type of an event.

Regarding examples of determining whether to receive an event message, an alarm message may contain grade information on a corresponding event. For example, based on importance of an event, a grade may be set. Having received an alarm message, a vehicle and/or pedestrian may determine whether to receive an event message based on a grade of the alarm message. Information on a grade may be preset or set to semi-static through RRC signaling. A grade may be differently processed according to a type of a receiving end. For example, depending on whether a receiving end is a vehicle or pedestrian, a processing according to a grade within an alarm message may be determined differently. Moreover, as described above, a vehicle or pedestrian may determine whether to receive an event message based on grade information within an alarm message. Moreover, if determining not to receive an event message, a vehicle or pedestrian may maintain a sleep mode.

In the above-described embodiments, an alarm message may contain information on a type of an event message for an associated event. For example, an event of a specific type may be important not to a pedestrian but to a vehicle, and vice versa. Moreover, an event of a specific type may be important or not depending on a situation of a vehicle and/or pedestrian. For example, a vehicle may be in a situation of being driven in downtown or on a highway, and a priority and/or importance of an event of a specific type may be determined according to each situation. For example, a pedestrian may be in a situation of crossing a road or walking down an alley, and a priority and/or importance of an event of a specific type may be determined according to each situation. Hence, whether to receive an event message or whether to request an event message may be determined based on an alarm message and a situation of a receiving end. Moreover, an alarm message may contain an indicator for specifying a type of a receiving end. For example, an alarm message may contain an indicator indicating a pedestrian or vehicle as a receiving target of a corresponding event message. A type of an event and/or a type of a receiving end, which may be contained in an alarm message, may be preset by a receiving end. Moreover, a type of an event and/or a type of a receiving end may be set by a receiving end through RRC signaling. Moreover, a type of an event and/or a type of a receiving end may be set semi-statically for a receiving end through RRC signaling.

Moreover, for example, an alarm message may contain information on an operation requested by an event message. For example, the requested operation may include an operation for a vehicle to lower a speed. Moreover, the requested operation may include an operation for a pedestrian to stop or dodge in another direction.

As described above, an alarm message may contain information on a type of an event. For example, a plurality of alarm messages for the same event may be sent. If an alarm message contains information on a type of an event only, a receiving end may fail to recognize the same event but attempt to decode a whole event message for each alarm message. Hence, the alarm message may contain information indicating the nth time the alarm message for the same vent is sent.

Meanwhile, if an alarm message is sent for a specific vehicle or pedestrian, an alarm message and an event message may be aperiodically sent once only.

In the aforementioned embodiments, although an alarm message is sent on a physical layer, a message within the alarm message may be linked to a layer higher than the physical layer. For example, a message within an alarm message may be defined on an application layer or a layer over RAN (radio access network) protocol. In this case, after a receiving end has received an alarm message, in order to determine whether to receive a corresponding event message, decoding should be performed up to a higher layer. In order to decode a higher layer, a receiving end may consume more power. Hence, a higher layer may direct an alarm message, which requires a reception of an event message among alarm messages, to a physical layer or a MAC (medium access control) layer.

For example, an alarm message may be defined to have a value selected from 00, 01, 10 and 11 on a physical layer or a MAC layer. Moreover, for example, '00' may be associated with a message 'a dangerous vehicle exists on an alley adjacent to a receiving pedestrian' of a higher layer, '01' may be associated with a message 'a dangerous vehicle exists on a crosswalk adjacent to a receiving pedestrian' of a higher layer, '10' may be associated with a message 'a disabled vehicle exists around a receiving pedestrian' of a higher layer, and '11' may be associated with a message 'an accident vehicle exists around a receiving pedestrian' of a higher layer. In this case, depending on a situation of the receiving end, whether to receive an event message may be determined. For example, a receiving end, which is a pedestrian, may receive an event message for a dangerous situation only in a situation remote from a crosswalk. Hence, in the above example, the receiving end may need to read the message 'a dangerous vehicle exists on an alley adjacent to a receiving pedestrian' corresponding to '00'. In this case, a higher layer may direct to decode an alarm message up to a higher layer only if an indicator on a physical or MAC layer is '00'. Hence, filtering may be performed on an alarm message without decoding an actual message of a higher layer.

In the above embodiment, although whether to decode a higher layer of an alarm message is directed by the higher layer, an RSU may direct a decoding required alarm message to a receiving end. For example, if an RSU recognizes an adjacent dangerous vehicle, it may broadcast an alarm message for the dangerous vehicle. In this case, the RSU may broadcast a signal for forcing a receiving end to receive alarm messages associated with the dangerous vehicle. Having received the signal from the RSU, an adjacent pedestrian/vehicle may receive a message about a dangerous vehicle among the alarm messages without filtering. Moreover, the RSU may direct an alarm message for an event, of which reception is determined as unnecessary, among alarm messages. For example, if an event occurs on a street distant from the RSU over a preset distance, the RSU may broadcast a signal indicating that a reception of an alarm message for the corresponding event is not necessary. Having received the signal, a pedestrian/vehicle may filter an alarm message corresponding to an event directed by the RSU among alarm messages. For example, the RSU may send information for the filtering of an alarm message to a receiving end using information on a physical or MAC layer.

In the aforementioned embodiments, broadcasting units may re-send or relay an alarm message and/or an event message. Yet, if such re-sending or relay is performed excessively, a transmission resource and power of a broadcasting unit may be wasted. Hence, by grouping the broadcasting units, such waste can be prevented. For example, a broadcasting unit in a corresponding group may be configured to broadcast, re-send or relay an alarm message and/or an event message only.

For example, a broadcasting unit can be grouped according to a type of an event. For example, a type of an event may include a disabled vehicle, a traffic situation, an accident vehicle, or the like. And, broadcasting units may be grouped per resource pool. Moreover, broadcasting units may be grouped according to an identifier of a vehicle. The aforementioned grouping may be preset or set by a base station. And, the grouping may be determined according to a preset rule. For example, vehicles may be grouped according to a result value of a modulo operation of a vehicle identifier.

Moreover, specific or some of broadcasting units within the aforementioned group may be able to broadcast an alarm or event message only. For example, based on a preset rule or a signaling from a base station, some or specific broadcasting units within a group may broadcast an alarm or event message.

Meanwhile, broadcasting of an alarm message and/or an event message for a plurality of events may occur simultaneously. In this case, a base station may send a signal indicating an event to broadcast to a group or a specific broadcasting unit within the group. For example, a base station may indicate an event, which is to be broadcasted to a group or a specific broadcasting unit, using a bitmap. For example, each bit in a bitmap may correspond to each event. For example, a bitmap [0 1 0 . . . ] corresponds to [event 1, event 2, event 3 . . . ], and the above bitmap indicates a broadcasting of event 2. Moreover, which one of a plurality of events will be broadcasted may be determined according to a preset rule.

Moreover, an alarm message and/or an event message may be synchronized between a transmitting end and a receiving end based on GPS (global positioning system) time. Moreover, for example, in case that a broadcasting unit is a base station and/or RSU, a transmitting end and a receiving end may be synchronized based on network time.

Figure 11A:
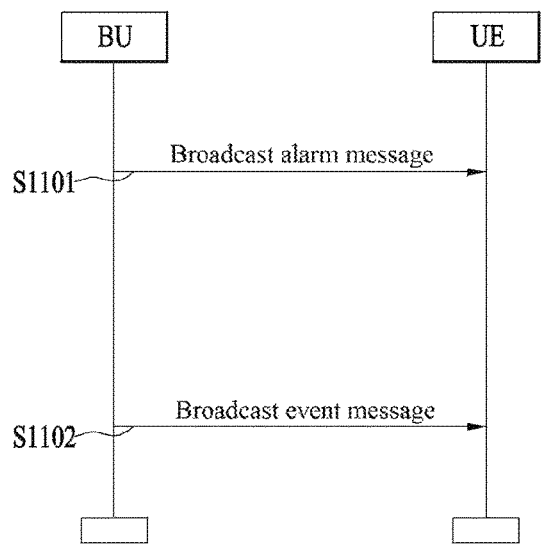
FIG. 11A is a flowchart of an alarm message sending method according to one embodiment.

FIG. 11A is a flowchart of an alarm message sending method according to one embodiment.

Referring to FIG. 11A, a broadcasting unit (BU) may broadcast an alarm message indicating an occurrence of an event [S1101]. The BU may include one of a vehicle, a pedestrian, an RSU, and a base station. The BU may re-send or relay an alarm message. A user equipment (UE) may refer to a pedestrian or a vehicle. For example, an alarm message may be broadcasted using an uplink or downlink resource. An alarm message may be broadcasted at the frequency higher than that of an event message containing substantial information on an event. For example, a first period for a transmission of an alarm message may be set shorter than a second period for a transmission of an event message. An alarm message may be broadcasted according to a preset cycle. Information on a transmission cycle (or a transmission period) of an alarm message may be sent through higher layer signaling for example. Meanwhile, although not shown in FIG. 11A, as described above, an alarm message can contain alarms for a plurality of events.

Information for a reception of an event message subsequent to the alarm message may be contained in the alarm message. The UE may determine a reception timing of an event message based on the information within the alarm message. The UE may transition to a wake-up mode from a sleep mode at the reception timing of the event message. For example, the alarm message may contain grade information and/or type information associated with an event.

Figure 11B:
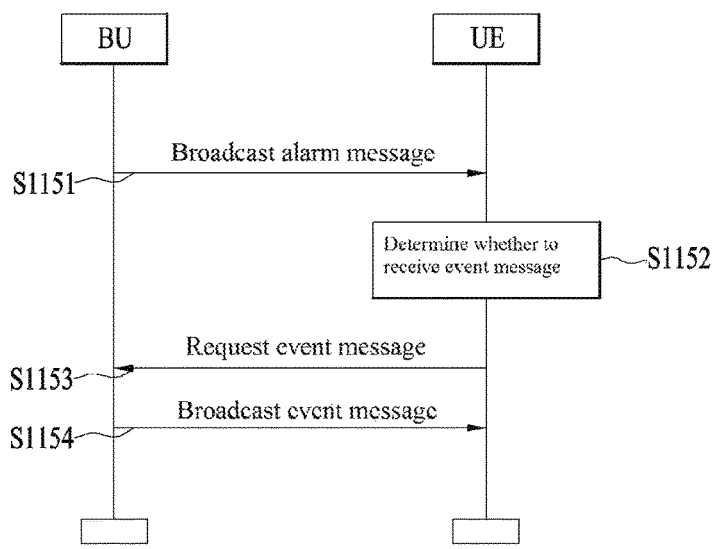
FIG. 11B is a flowchart of an alarm message sending method according to one embodiment.

Meanwhile, as shown not in FIG. 11A but in FIG. 11B, based on an alarm message, the UE may determine whether to receive an event message. Hence, if determining not to receive an event message, the UE may maintain the sleep mode.

Moreover, although not shown in FIG. 11A, the alarm message broadcasting [S1101] may be performed in response to an alarm message sending request from the UE.

Moreover, the BU may broadcast an event message containing substantial information on an event [S1102]. The event message contains information on the event and may be broadcasted using a preset resource. Moreover, the event message may be broadcasted according to a transmitting resource determined based on the information in the alarm message.

Moreover, although not shown in FIG. 11A, the event message broadcasting [S1102] may be performed in response to a request from the UE.

FIG. 11B is a flowchart of an alarm message sending method according to one embodiment.

For clarity, the description redundant with FIG. 11A shall be omitted. In FIG. 11B, a UE determines whether to receive an event message based on an alarm message [S1152]. If determining to receive the event message, the UE requests a broadcasting of the event message [S1153]. The event message sending request may be sent using a preset resource. Whether to receive the event message may be determined based on information in the alarm message, RRC signaling, and/or signaling from RSU. Detailed examples may refer to the aforementioned embodiments.

Regarding the description with reference to FIGS. 1 to 11B, an alarm message may be called a first message and an event message may be called a second message. As describe above, a broadcasting unit may be limited to a specific group or a specific broadcasting unit. Besides, a user equipment may determine whether to receive/decode an alarm message and/or an event message or filter an alarm message and/or an event message, based on preset information, signaling from a base station or the like. For clarity, all the aforementioned embodiments are not described with reference to FIG. 11A and FIG. 11B, it is apparent to those skilled in the art that the aforementioned embodiments can be combined in the event message sending method of FIG. 11A and FIG. 11B.

Figure 12:
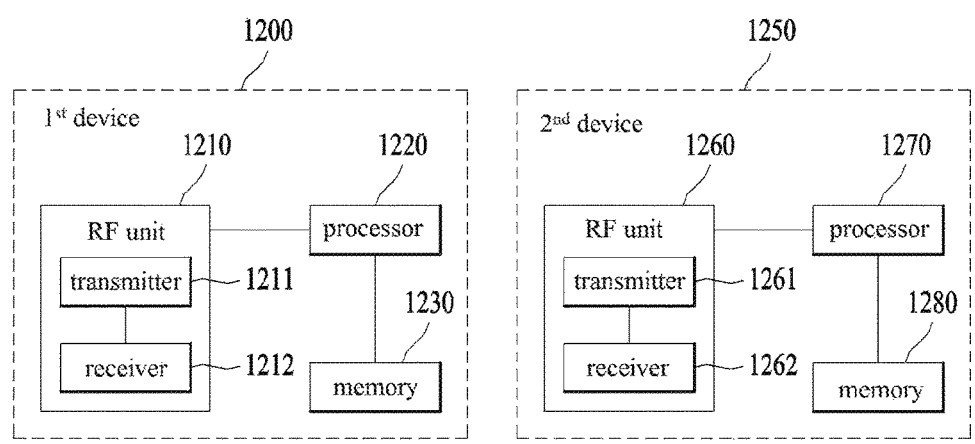
FIG. 12 is a schematic diagram illustrating devices according to an embodiment of the present invention.

FIG. 12 schematically illustrates configuration of devices to which the embodiments of the present invention illustrated in FIGS. 1 to 11B may be applied according to an embodiment of the present invention.

In FIG. 12, each of a first device 1200 and a second device 1250, which are D2D UEs, includes a radio frequency (RF) unit 1210, 1260, a processor 1220, 1270, and, optionally, a memory 1230, 1280. Although FIG. 15 shows configuration of two D2D UEs, a plurality of D2D UEs may establish a D2D communication environment.

Each of the RF unit 1230 and 1260 may include a transmitter 1211, 1261 and a receiver 1212, 1262. The transmitter 1211 and the receiver 1212 of the first device 1200 may be configured to transmit and receive signals to and from the second device 1250 and other D2D UEs, and the processor 1220 may be functionally connected to the transmitter 1211 and the receiver 1212 to control the transmitter 1211 and the receiver 1212 to transmit and receive signals to and from other devices. Meanwhile, the first device 1200 and/or the second device 1250 may be an eNB.

The processor 1220 may perform various kinds of processing on a signal to be transmitted, and then transmit the signal to the transmitter 1211, and process a signal received by the receiver 1212. If necessary, the processor 1220 may store, in the memory 1230, information contained in an exchanged message.

With the above-described structure, the first device 1200 may perform the methods of the various embodiments of the present invention described above. For example, each signal and/or message may be transmitted and received using a transmitter and/or receiver of the RF unit, and each operation may be performed under control of the processor.

Meanwhile, although not shown in FIG. 12, the first device 1200 may include various additional elements according to device application type. For example, if the first device 1200 is for intelligent metering, the first device 1200 may include an additional element for power measurement and the like. The operation of power measurement may be under control of the processor 1220 or a separately configured processor (not shown).

For example, the second device 1250 may be an eNB. In this case, the transmitter 1261 and receiver 1262 of the eNB may be configured to transmit and receive signals to and from other eNBs, D2D servers, D2D devices, and the processor 1270 may be functionally connected to the transmitter 1261 and receiver 1262 and may be configured to control the process of the transmitter 1261 and the receiver 1262 transmitting and receiving signals to and from other devices. In addition, the processor 1270 may perform various kinds of processing on a signal to be transmitted, transmit the signal to the transmitter 1261, and process a signal received by the receiver 1262. If necessary, the processor 1270 may store, in the memory 1230, information contained in an exchanged message. With the above-described structure, the eNB 1250 may perform the methods of the various embodiments described above.

In FIG. 12, the processors 1220 and 1270 of the first device 1210 and the second device 1250 respectively instruct operations for the first device 1210 and the second device 1250 (for example, control, adjustment, management, etc.). Each of the processors 1220 and 1270 may be connected to the memory 1230, 1280 that stores program code and data. The memories 1230 and 1280 may be connected to the processors 1220 and 1270 to store operating systems, applications, and general files.

The processors 1220 and 1270 of the present invention may be referred to as a controller, a microcontroller, a microprocessor, a microcomputer, or the like. Meanwhile, the processors 1220 and 1270 may be implemented by hardware, firmware, software, or a combination thereof. When embodiments of the present invention are implemented using hardware, the processors 1520 and 1570 may include application specific integrated circuits (ASICs), digital signal processors (DSPs), digital signal processing devices (DSPDs), programmable logic devices (PLDs), or field programmable gate arrays (FPGAs).

When embodiments of the present invention are implemented using firmware or software, the firmware or software may be configured to include modules, procedures, or functions that perform the functions or operations of the present invention. The firmware or software configured to implement the present invention may be provided within the processor or may be stored in the memory and driven by the processor.

The embodiments described above are constructed by combining elements and features of the present invention in a predetermined form. Each element or feature should be understood as optional unless explicitly mentioned otherwise. Each of the elements or features can be implemented without being combined with other elements. In addition, some elements and/or features may be combined to configure an embodiment of the present invention. The sequence of operations discussed in the embodiments of the present invention may be changed. Some elements or features of one embodiment may also be included in another embodiment, or may be replaced by corresponding elements or features of another embodiment. Claims that are not explicitly cited in each other in the appended claims may be combined to establish an embodiment of the present invention or be included in a new claim by subsequent amendment after the application is filed.

The present invention may be embodied in specific forms other than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein.

INDUSTRIAL APPLICABILITY

The above-described embodiments of the present invention can be applied to various kinds of mobile communication systems.

What is claimed is:

1. A method of receiving an alarm for an event of a user equipment (UE) in a wireless communication system, the method comprising:
   receiving a first message containing grade information of the event from a broadcasting unit;
   determining whether to receive a second message based on the grade information;
   transitioning from a sleep mode to a wakeup mode to receive the second message; and
   receiving the second message containing information on the event from the broadcasting unit,
   wherein, from the broadcasting unit, the first message is transmitted according to a first period and the second message is transmitted according to a second period, and
   wherein the first period is shorter than the second period.

2. The method of claim 1, further comprising:
   making a request for transmitting the second message to the broadcasting unit if determining to receive the second message,
   wherein the second message is transmitted from the broadcasting unit in response to the request.

3. The method of claim 1, further comprising:
   determining a reception timing of the second message based on a reception timing of the first message, the first period and the second period.

4. The method of claim 1, wherein the grade information is received on a physical layer or a MAC (medium access control) layer.

5. The method of claim 1, wherein the first message and the second message are received using a resource synchronized based on a GPS (global positioning system) time.

6. The method of claim 1, wherein the broadcasting unit is one of a vehicle, a terminal of a pedestrian, a roadside unit, or a base station.

7. A method of transmitting an alarm for an event of a broadcasting unit in a wireless communication system, comprising:
   broadcasting a first message containing grade information of the event;
   receiving a request for transmitting a second message determined based on the grade information from a user equipment (UE); and
   broadcasting the second message containing a context for the event in response to the request for transmitting the second message,
   wherein the first message is broadcasted according to a first period and the second message is broadcasted according to a second period, and
   wherein the first period is shorter than the second period.

8. The method of claim 7, wherein the grade information is received on a physical layer or a MAC (medium access control) layer.

9. The method of claim 7, wherein the first message and the second message are received using a resource synchronized based on a GPS (global positioning system) time.

10. The method of claim 7, wherein the broadcasting unit is one of a vehicle, a terminal of a pedestrian, a roadside unit, or a base station.

11. A user equipment (UE) receiving an alarm for an event in a wireless communication system, the UE comprising:
- a transceiver configured to transceive wireless signals; and
- a processor configured to control the transceiver,
- wherein the processor is further configured to:
- receive a first message containing grade information of the event from a broadcasting unit,
- determine whether to receive a second message based on the grade information,
- transition from a sleep mode to a wakeup mode to receive the second message, and
- receive the second message containing information on the event from the broadcasting unit
- wherein, from the broadcasting unit, the first message is transmitted according to a first period and the second message is transmitted according to a second period, and
- wherein the first period is shorter than the second period.

12. A broadcasting unit transmitting an alarm for an event in a wireless communication system, the broadcasting unit comprising:
- a transceiver configured to transceive wireless signals; and
- a processor configured to control the transceiver,
- wherein the processor is further configured to
- broadcast a first message containing grade information of the event,
- receive a request for transmitting a second message determined based on the grade information from a user equipment (UE), and
- broadcast the second message containing a context for the event in response to the request for transmitting the second message,
- wherein the first message is broadcasted according to a first period and the second message is broadcasted according to a second period, and
- wherein the first period is shorter than the second period.

* * * * *